United States Patent
Hall et al.

(10) Patent No.: US 9,628,126 B1
(45) Date of Patent: Apr. 18, 2017

(54) METHOD AND SYSTEM FOR A DUAL MODULATION LOW DATA RATE NETWORK

(71) Applicants: David R. Hall, Provo, UT (US); Mark Hall, Springville, UT (US); Craig Boswell, Draper, UT (US); Jedediah Knight, Provo, UT (US)

(72) Inventors: David R. Hall, Provo, UT (US); Mark Hall, Springville, UT (US); Craig Boswell, Draper, UT (US); Jedediah Knight, Provo, UT (US)

( * ) Notice: Subject to any disclaimer, the term of this patent is extended or adjusted under 35 U.S.C. 154(b) by 0 days.

(21) Appl. No.: 15/145,235

(22) Filed: May 3, 2016

(51) Int. Cl.
*H04B 1/38* (2015.01)
*H04B 1/713* (2011.01)
*H04L 27/10* (2006.01)
*H04L 7/00* (2006.01)
*H04L 29/06* (2006.01)

(52) U.S. Cl.
CPC ............... *H04B 1/38* (2013.01); *H04B 1/713* (2013.01); *H04L 7/0008* (2013.01); *H04L 27/10* (2013.01); *H04L 63/0209* (2013.01)

(58) Field of Classification Search
CPC ......... H04B 1/38; H04B 1/713; H04L 7/0008; H04L 27/10; H04L 63/0209
See application file for complete search history.

(56) References Cited

U.S. PATENT DOCUMENTS

| 4,499,425 | A  | * | 2/1985  | Maas ..................... H04L 27/144 327/42 |
| 5,887,020 | A  |   | 3/1999  | Smith |
| 6,720,861 | B1 | * | 4/2004  | Rodenbeck ........ G07C 9/00103 340/5.6 |
| 6,763,315 | B2 | * | 7/2004  | Xydis ...................... G06F 21/35 702/127 |
| 6,865,216 | B1 |   | 3/2005  | Beamish |
| 7,676,198 | B2 |   | 3/2010  | Mahany |
| 8,326,348 | B2 |   | 12/2012 | Choi |
| 2001/0034223 | A1 | * | 10/2001 | Rieser ....................... G01S 5/02 455/404.2 |
| 2005/0195775 | A1 | * | 9/2005  | Petite ................... H04W 72/082 370/338 |
| 2011/0111700 | A1 | * | 5/2011  | Hackett ................. A01G 25/16 455/41.2 |

* cited by examiner

Primary Examiner — Sophia Vlahos

(57) ABSTRACT

A dual modulation network is disclosed. The dual modulation network includes a primary network hub (PNH) having a PNH Long range transceiver and a PNH microcontroller. The PNH microcontroller has communication firmware for long range spread spectrum (SS) and narrowband frequency shift keying (FSK) signal communication via the PNH Long range transceiver, and includes a PNH clock signal. The dual modulation network also includes a peripheral device (PD). The PD includes an actuation mechanism, a PD Long range transceiver, and a PD microcontroller. The PD microcontroller has actuation firmware, communication firmware for communication via the PD Long range transceiver, and location firmware, and includes a clock signal. The location firmware instructs the PD long range transceiver to transmit a location signal encoded with a PD transmit time stamp notifying a receiving device of the time the PD transmitted the location signal.

17 Claims, 16 Drawing Sheets

METHOD AND SYSTEM FOR A DUAL MODULATION LOW DATA RATE NETWORK

TECHNICAL FIELD

This invention relates generally to the field of dual modulation networks, and more specifically to long range, low data rate dual modulation networks.

BACKGROUND

Device-device communication and coordination, coined the "internet of things" (IoT), is primarily accomplished through direct communication between devices via wireless protocols such as Bluetooth, ZigBee, Wifi and 3G and 4G systems, among others. These protocols have the benefit of having high throughput, but have either a short range or require significant power to operate over longer ranges. This results in short battery lives for wireless devices communicating over these types of networks. The Z-Wave protocol, which operates at a lower frequency, improves on these limitations, but still has a limited range of up to 200 meters. The range of a Z-Wave network can be extended via a mesh network, but is currently limited to forwarding data across four hubs. However, a mesh network can be cost-intensive because of the significant amount of hardware and power required. Additionally, many IoT applications require devices to communicate over long distances over which it is impractical or impossible to add range-extending nodes. Thus, for many IoT applications, the significant cost and limited range severely limits functionality.

SUMMARY OF THE INVENTION

A dual modulation, low data rate network and methods for communicating over such a network are described below which overcome the limitations of the current state of the art described above. Generally, the network includes one or more hubs and one or more peripheral devices. The hubs each have Long range transceivers and microcontrollers. The hub microcontrollers are programmed with firmware that instructs the Long range transceivers to use either a long range spread spectrum (SS) signal for communicating information, or a narrowband frequency shift keying (FSK) signal. The hub microcontrollers also include firmware that instructs the Long range transceivers to listen for the long range SS or narrowband FSK signals.

The features just described offer several benefits over those systems described in the background above. First, the long range transceivers communicate over the 900 MHz ISM channel, whereas other protocols operate at higher frequencies. Thus, the long range signals are more robust despite obstructions and long distances. Second, the dual modulation also enables the system to be more robust over longer distances and around obstructions, while still conserving power and extending battery life for peripheral devices. In some cases, battery life is two years or longer, depending on the amount of data the peripheral device sends and/or receives per use. In addition to these benefits, those of skill in the art will recognize other benefits not described herein, but inherent to the system.

In one embodiment, a system is described which includes a primary network hub (PNH). The primary network hub includes a Long range transceiver and a microcontroller. The primary network hub microcontroller has communication firmware for long range SS and narrowband FSK signal communication via the primary network hub Long range transceiver. Additionally, the PNH microcontroller includes a clock signal. The system also includes a peripheral device (PD). The PD has an actuation mechanism, a Long range transceiver, and a microcontroller. The peripheral device microcontroller has actuation firmware, communication firmware for communication via the PD Long range transceiver, a clock signal synchronized with the PNH clock signal, and location firmware. The location firmware instructs the PD long range transceiver to transmit a location signal encoded with a PD transmit time stamp notifying a receiving device, such as the PNH, of the time the PD transmitted the location signal.

A method is also disclosed. The method includes receiving and storing a system operation instruction at a primary network hub having a Long range transceiver, associating the system operation instruction with a peripheral device having a Long range transceiver and an actuation mechanism, and located remotely from the primary network hub, and receiving and storing peripheral device location information associated with the peripheral device. The method further includes determining a range between the primary network hub and the peripheral device, choosing one of a long range SS signal or a narrowband FSK signal based on the range, and transmitting the long range SS signal or the narrowband FSK signal from the primary network hub communicating actuation instructions for the peripheral device based on the system operation instruction.

Another method is disclosed, which includes receiving and storing a system operation instruction at a primary network hub having a Long range transceiver, associating the system operation instruction with a secondary network hub having a Long range transceiver and located remotely from the primary network hub, and receiving and storing, at the primary network hub, location information for the secondary network hub. The method further includes determining a range between the primary network hub and the secondary network hub, choosing a first long range SS signal or a first narrowband FSK signal based on the range, and transmitting the first long range SS signal or the first narrowband FSK signal from the primary network hub communicating a secondary network hub instruction based on the system operation instruction. The method also includes receiving, at the secondary network hub Long range transceiver, the secondary network hub instruction, associating the secondary network hub instruction with a peripheral device having a Long range transceiver and an actuation mechanism, and located remotely from the secondary network hub and the primary network hub, and receiving and storing, at the secondary network hub, location information for the peripheral device. Additionally, the method includes determining a range between the secondary network hub and the peripheral device, choosing a second long range SS signal or a second narrowband FSK signal based on the range, and transmitting the second long range SS signal or the second narrowband FSK signal from the primary network hub communicating a peripheral device instruction based on the secondary network hub instruction.

BRIEF DESCRIPTION OF THE DRAWINGS

A more particular description of the invention briefly described above is made below by reference to specific embodiments. Several embodiments are depicted in drawings included with this application, in which.

DETAILED DESCRIPTION

Figure 1:
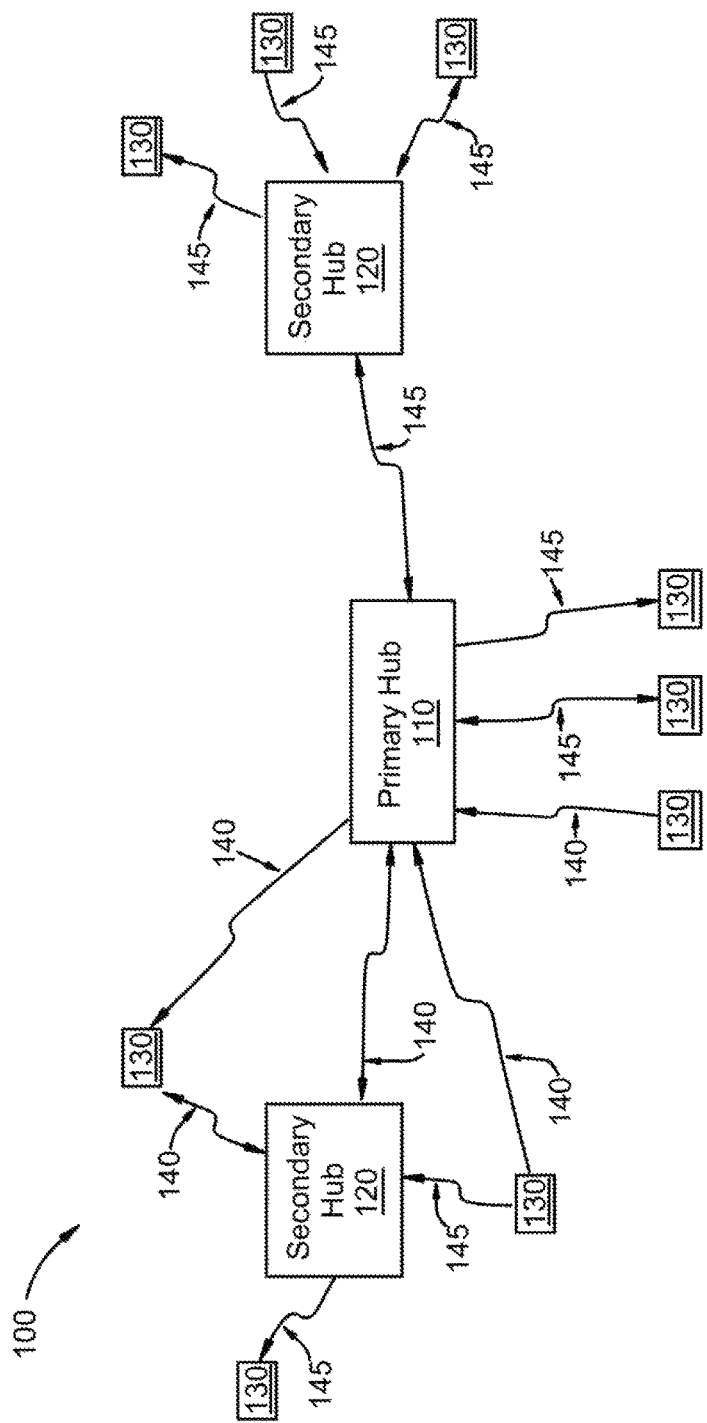
FIG. 1 depicts a dual modulation, star-plus-star network.

A detailed description of the claimed invention is provided below by example, with reference to embodiments in the appended figures. Those of skill in the art will recognize that the components of the invention as described by example in the figures below could be arranged and designed in a wide variety of different configurations, including combinations of embodiments described below or other embodiments not described. Thus, the detailed description of the embodiments in the figures is merely representative of embodiments of the invention, and is not intended to limit the scope of the invention as claimed.

In some instances, features represented by numerical values, such as dimensions, mass, quantities, and other properties that can be represented numerically, are stated as approximations. Unless otherwise stated, an approximate value means "correct to within 50% of the stated value." Thus, a length of approximately 1 inch should be read "1 inch+/−0.5 inch."

All or part of the present invention may be embodied as a system, method, and/or computer program product. The computer program product may include a computer readable storage medium (or media) having computer readable program instructions thereon for causing a processor to carry out aspects of the present invention. For example, the computer program product may include firmware programmed on a microcontroller.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, a chemical memory storage device, a quantum state storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming languages such as Smalltalk, C++ or the like, and conventional procedural programming languages such as the "C" programming language or similar programming languages. Computer program code for implementing the invention may also be written in a low-level programming language such as assembly language.

In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. Those of skill in the art will understand that each block of the flowchart illustrations and/or block diagrams, and combinations of blocks in the flowchart illustrations and/or block diagrams, may be implemented by computer readable program instructions. Additionally, those of skill in the art will recognize that the system blocks and method flowcharts, though depicted in a certain order, may be organized in a different order and/or configuration without departing from the substance of the claimed invention.

These computer readable program instructions may be provided to a processor of a general purpose computer, special purpose computer, embedded system, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

FIG. 1 depicts one embodiment of a dual modulation network 100 according to the claimed invention. Dual modulation network 100 includes primary network hub (PNH) 110, one or more secondary network hubs (SNH) 120 located remotely from PNH 110 within a PNH-SNH transmit-receive range, and one or more peripheral devices (PD) 130. The PDs 130 are located remotely from the PNH 110 and the SNH 120 within at least one of a PNH-PD transmit-receive range or a SNH-PD transmit-receive range. PNH 110 has one or more Long range transceivers and one or more microcontrollers having communication firmware for long range spread spectrum (SS) and narrowband frequency shift keying (FSK) signal communication via the PNH Long range transceiver. SNH 120 similarly has one or more Long range transceivers and one or more microcontrollers having communication firmware for long range SS and narrowband FSK signal communication via the SNH Long range transceiver. PD 130 also has, in one embodiment of dual modulation network 100, an actuation mechanism, at least one Long range transceiver and at least one corresponding microcontroller having communication firmware for long range SS and narrowband FSK signal communication via the PD 130 Long range transceiver. In another embodiment, PD 130 has an actuation mechanism, at least one receiver and at least one corresponding microcontroller having receive firmware for long range SS and narrowband FSK signal communication. In yet another embodiment, PD 130 has an actuation mechanism, at least one transmitter and at least on corresponding microcontroller having transmit firmware for long range SS and narrowband FSK signal communication.

As used throughout the claims and specification, long range means any range from 0.5 to 30 miles. In some embodiments, long range means approximately 1 mile. In other embodiments, long range means ranging from 1 to 26 miles. In yet other embodiments, long range means approximately 10 miles.

PNH 110, SNH 120, and/or PD 130 communicate via long range SS signals 140 and/or narrowband FSK signals 145 based on a range between communicating devices. For example, in one embodiment, PNH 110 communicates with one PD 130 via long range SS signals 140 and with a second PD 130 via narrowband FSK signals 145. In such an example, this configuration would be particularly beneficial where the first PD 130 is outside a PNH-PD narrowband FSK communication range but within a PNH-PD long range SS communication range. In another embodiment, a PD 130 is mobile. PNH 110 communicates with PD 130 via narrowband FSK signals 145 when PD 130 is within the PNH-PD narrowband FSK range, and via long range SS signals 140 when PD 130 is outside the PNH-PD narrowband FSK range. In another embodiment, PNH 110 communicates with PD 130 via long range SS signals 140 even when PD 130 is within the PNH-PD narrowband FSK range.

Many PDs are controlled by instructions consisting of hundreds of bits to hundreds of kilobits of data. Such instructions thus do not need to be communicated over high-data rate networks, thus decreasing the power consumed in transmitting and receiving information. Rather, low-data instructions can be transmitted via a low-data rate signal while still having a fast response time, such as within one second. This is particularly important for battery-operated PDs. PD 130 is, in some embodiments, such a PD, where PD 130 is battery-operated and is controlled by instructions consisting of hundreds of bits to hundreds of thousands of bits. In one embodiment, PD 130 requires from 100 bits to 500 kilobits of data for instruction. In this embodiment, long range SS signals 140 communicate instructions to PD 130 at a rate from 100 bits per second (bps) to 500 kilobits per second (kbps). In another embodiment, PD 130 requires from 200 bits to 300 kilobits of data for instruction. In this other embodiment, long range SS signals 140 communicate instructions to PD 130 at a rate from 200 bps to 300 kbps. In yet another embodiment, PD 130 requires from 1 to 100 kilobits of data for instruction. In this embodiment, long range SS signals 140 communicate instructions to PD 130 at a rate from 1 to 100 kbps.

In one example, PNH 110 communicates with SNH 120 via long range SS signals 140. SNH 120 processes communications from PNH 110 and forwards information to PD 130 via narrowband FSK signals 145. Similarly, in another embodiment, SNH 120 receives information from PNH 110 via narrowband FSK signals 145, processes the information, and forwards information to PD 130 via long range SS signals 140. As another example, communication between PNH 110, SNH 120 and PD 130 is accomplished via solely long range SS signals 140 or solely narrowband FSK signals 145.

Long range SS signals 140 are any time of spread spectrum signal. For example, in one embodiment, long range SS signals 140 are long range spread spectrum frequency hopping (SSFH) signals. In another embodiment, long range SS signals 140 are long range direct-sequence spread spectrum (DSSS), time-hopping spread spectrum (THSS), or chirp spread spectrum (CSS) signals. Other embodiments include combinations of two or more of SSFH, DSSS, THSS, and/or CSS signals. In embodiments comprising SSFH, DSSS, THSS, and/or CSS signals, the microcontrollers described above include firmware having instructions for communicating using these signals. For example, in one embodiment, the PNH microcontroller firmware includes instructions for long range SSFH signal communication. In the same or another embodiment, the SNH microcontroller firmware similarly includes instructions for long range SSFH signal communication. Additionally, in the same or other embodiments, the PD microcontroller firmware includes instructions for long range SSFH signal communication. In one embodiment, the microcontroller firmware of the PNH, SNH and PD all include instructions for long range SSFH signal communication.

In one embodiment, each SNH 120 is associated with a particular group of PDs 130, where each PD 130 is associated with only one SNH 120. PNH 110 stores high-level system operation information and instructions. The system operation information and instructions include operation instructions for SNHs 120 and PDs 130, and information about which PD 130 is associated with which SNH 120.

PNH 110 transmits operation information and instructions to each SNH 120 for that hub only and its associated PDs. SNH 120 stores the operation information and instructions sent by PNH 110 and transmits and/or receives information, including instructions, to and/or from its associated PDs 130. Thus, PNH 110 acts as a system-wide control hub, and SNHs 120 act as local control hubs. This embodiment allows for robust communication with many devices while avoiding the interference and lag time of a single-hub system.

PD 130 may be any of a variety of apparatuses that include an actuation mechanism. In one embodiment, PD 130 is a gate for an access-controlled enclosure. For example, the enclosure, in one embodiment, is a perimeter fence surrounding a property such as a business, home, industrial complex, prison, or other access-controlled enclosures. In another embodiment, PD 130 is a door for allowing access to a structure or room within a structure. In one embodiment, PD 130 is a climate-control device, such as an HVAC system, for adjusting heating and cooling output inside a building. In yet another embodiment, PD 130 is an automated blind system and/or a light switch and/or system of light switches. PD 130 is also, in some embodiments, any of various household appliances, such as a refrigerator, stove, oven, dishwasher, clothes washing machine, clothes dryer, toilet, bath and/or shower, and kitchen appliances. In other embodiments, PD 130 is a personal computer, a printer/scanner, a fax machine and/or a telephone.

PD 130 is also, in some embodiments, any of a variety of commercial and/or industrial equipment. For example, in one embodiment, PD 130 is an elevator. In another embodiment, PD 130 is one of a variety of manufacturing equipment, such as a conveyor belt, a pump, a sensor, a motor, and/or a 3D printer. In yet other embodiments, PD 130 is a vehicle and/or a vehicle component such as a starter or a motor. In one embodiment, PD 130 is a drone.

Dual modulation network 100 is a stand-alone network that offers several benefits. First, dual modulation network 100 operates independently of the Internet. Thus, PNH 110 can communicate with each SNH 120 and PD 130 even when the external Internet connection is down. Additionally, in some embodiments of dual modulation network 100, PNH 110, SNHs 120 and PDs 130 are equipped with backup power. The backup power is, in some embodiments, local, such as a battery. In the same or other embodiments, the backup power is an off-grid power source such as a generator or batteries. In such embodiments, connectivity between PNH 110, SNHs 120 and PDs 130, and operability of each, continues through a grid-power outage.

An additional benefit of the stand-alone dual modulation network described above is inherent security. In order for a device to interpret a long range SS signal, it must know which frequencies to check. In dual modulation network 100, each of PNH 110, SNHs 120 and PDs 130 are programmed with a unique frequency sequence for dual modulation network 100. External observers not aware of the unique frequency sequence would interpret the signals from dual modulation network 100 as noise, even if the observer were trying to intercept signals from dual modulation network 100. For added security, PNH 110, SNHs 120 and PDs 130 include, in some embodiments, tamper firmware that notifies an authorized user that the device has been tampered with before an unauthorized user can obtain the frequency sequence, automatically changes the frequency sequence, and updates other devices on the network with the new frequency sequence. For example, PNH 110 receives a tamper signal from PD 130. PNH 110 changes the frequency sequence and updates SNHs 120 and other PDs 130 with the new sequence. PNH 110 then notifies an authorized user that PD 130 has been tampered with and the frequency sequence has been updated.

The foregoing PD 130 embodiments described are examples only, and are not to be construed as limiting the scope of PD 130. Rather, PD 130 is any device or system that includes an actuation mechanism that performs a tangible function, such as turning a light in a room on or off, unlocking and/or opening a gate, and opening and/or closing blinds.

Figure 2:
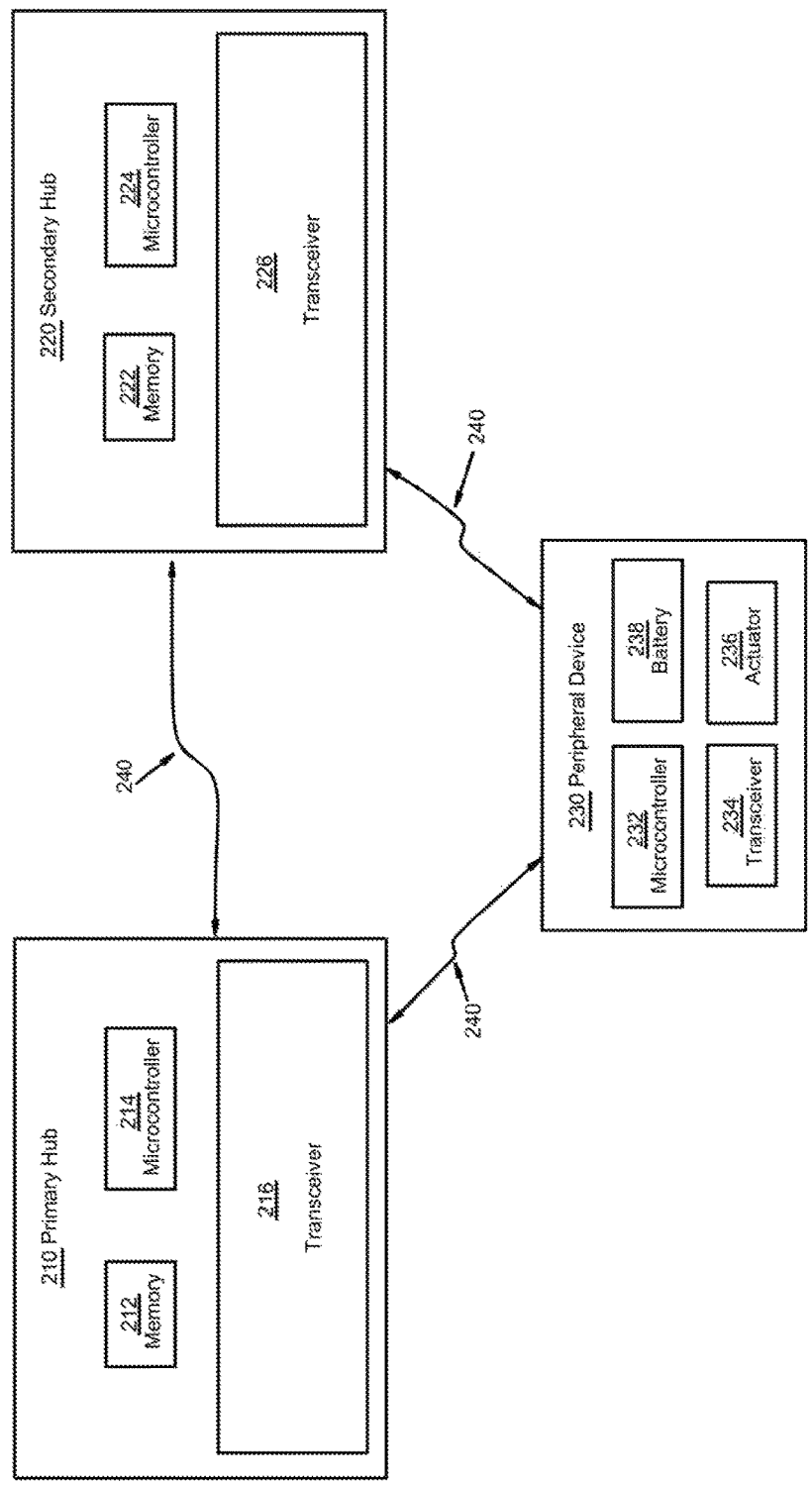
FIG. 2 depicts another dual modulation network.

FIG. 2 depicts another dual modulation network 200. PNH 210 includes memory 212, microcontroller 214, and transceiver 216. Similarly, SNH 220 includes memory 222, microcontroller 224, and transceiver 226. PD 230 includes microcontroller 232, transceiver 234, actuator 236, and battery 238. PNH 210, SNH 220 and PD 230 communicate via wireless signals 240. Wireless signals 240 are any type of wireless signal. For example, in one embodiment, wireless signals 240 are long range SS signals such as SSFH, DSSS, THSS and/or CSS on the 900 MHz ISM band, or narrowband FSK signals on the 900 MHz ISM band.

PD 230 is any one of the various devices described above with regard to PD 130 in FIG. 1. Memories 212 and 222 are any of a variety of non-volatile memory devices such as ROM, flash, hard disk, and/or optical disk. Similarly, microcontrollers 214, 224 and 232 are, in some embodiments, any of a variety of of-the-shelf microcontrollers. Transceivers 216, 226 and 234 are also, in some embodiments, any of a variety of off-the-shelf 900 MHz ISM band transceivers. For example, in various embodiments, one or more of transceivers 216, 226 and 234 are Long range transceivers.

Microcontroller 214 and transceiver 212 are, in some examples, networked via a printed circuit board (PCB). However, in some embodiments, microcontroller 214 and transceiver 216 are networked in a network-on-chip (NoC) architecture. Similarly, in some embodiments, microcontroller 224 and transceiver 226 are networked via PCB, whereas in some other embodiments, microcontroller 224 and transceiver 226 are networked in a NoC architecture. Additionally, in some embodiments, microcontroller 232 and transceiver 234 are networked via PCB, whereas in other examples microcontroller 232 and transceiver 234 are networked in a NoC architecture.

Memory 212 is networked to microcontroller 214 and transceiver 216. Similarly, memory 222 is networked to microcontroller 224 and transceiver 226. This networking may be accomplished by any of a variety of means, such as via PCB, ribbon cable, NoC architecture, or a combination thereof. Thus, in some embodiments, memory 212 and microcontroller 214 are networked via PCB, ribbon cable, NoC architecture, or a combination thereof. Similarly, in some embodiments, memory 222 and microcontroller 224 are networked via PCB, ribbon cable, NoC architecture, or a combination thereof.

PNH 210, SNH 220 and PD 230 may be powered by any of a variety of means. For example, as depicted, PD 230 includes a battery in some embodiments. However, in other embodiments, PD 230 is powered via a standard electrical outlet or another external power source. PNH 210 and SNH 220 are powered via standard electrical outlets or another external power source in some embodiments, but also include, in such and other embodiments, backup batteries in case of power failure. In some embodiments, PD 230 also includes a backup battery in case battery 238 fails.

Figure 3:
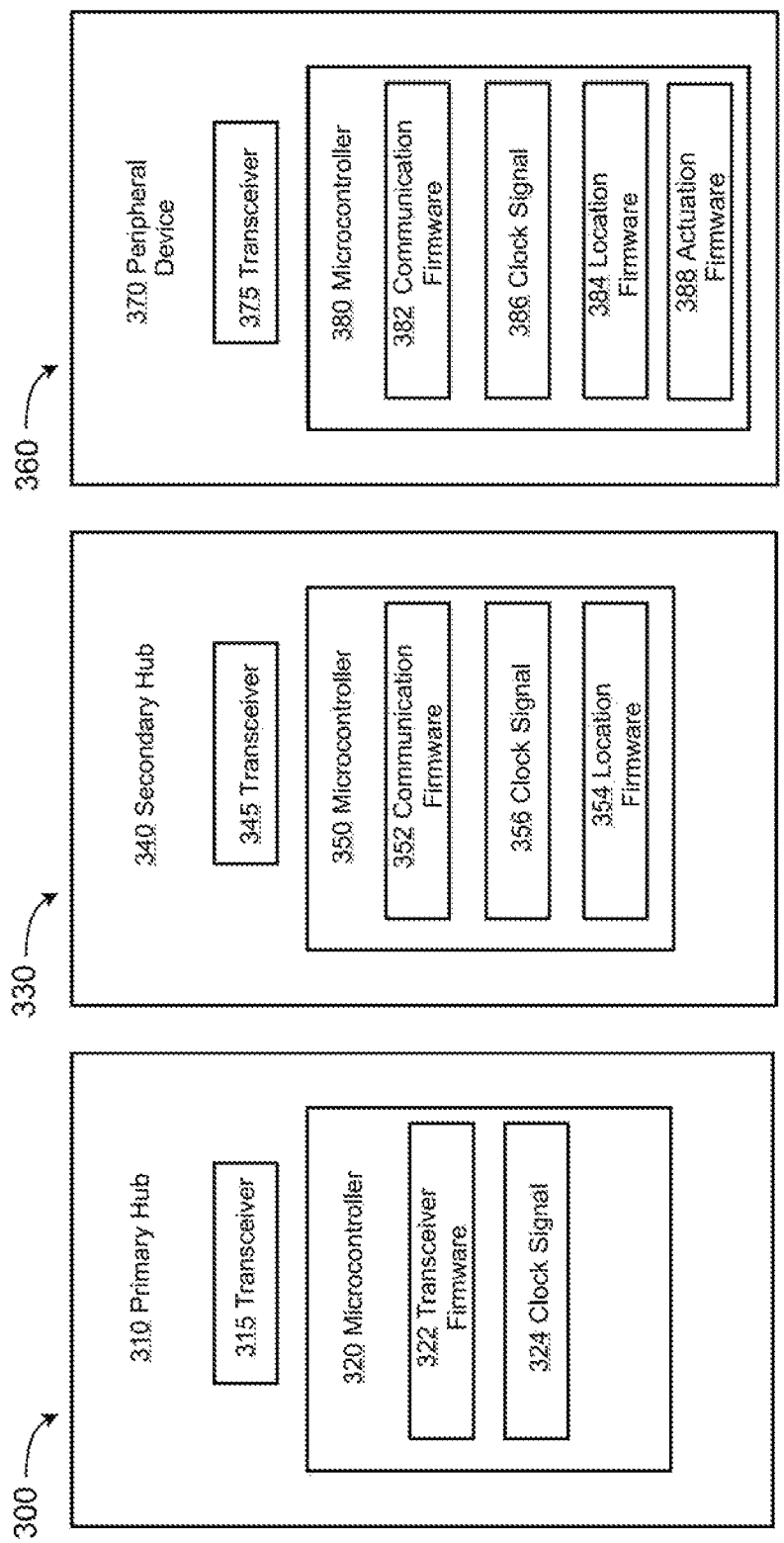
FIGS. 3A-C depict embodiments of system devices.

FIGS. 3A-C depict embodiments of system devices 300, 330, 360. PNH 310 includes transceiver 315 and microcontroller 320. Microcontroller 320 is programmed with transceiver firmware 322 and includes clock signal 324. Transceiver firmware 322 comprises long range SS and narrowband FSK signal communication instructions. For example, in one embodiment, transceiver firmware 322 comprises instructions for long range spread spectrum frequency hopping signal communication.

In FIG. 3B, SNH 340 includes transceiver 345 and microcontroller 350. Microcontroller 350 is programmed with transceiver firmware 352, location firmware 354, and includes clock signal 356. Clock signal 356 is synchronized with clock signal 324. Location firmware 354 instructs transceiver 345 to transmit a location signal encoded with a transmit time stamp from clock signal 356. The location signal notifies a receiving device of the time, which is associated with the clock signal, SNH 340 transmitted the location signal. For example, in one embodiment, the receiving device is PNH 310. Because PNH 310 and SNH 340 clock signals 324, 356 are synchronized, PNH 310 can determine a time of flight for the signal and determine the distance from PNH 310 to SNH 340. In some embodiments, microcontroller 320 is programmed to choose, based at least in part on the distance from PNH 310 to SNH 340, a long range SS signal or a narrowband FSK signal. For example, in one embodiment, PNH 310 determines the distance to SNH 340 is 20 meters, and chooses the narrowband FSK signal for communication between PNH 310 and SNH 340. In another embodiment, PNH 310 determines the distance to SNH 340 is 1 mile, and chooses the long range SS signal for communication between PNH 310 and SNH 340.

Figure 4:
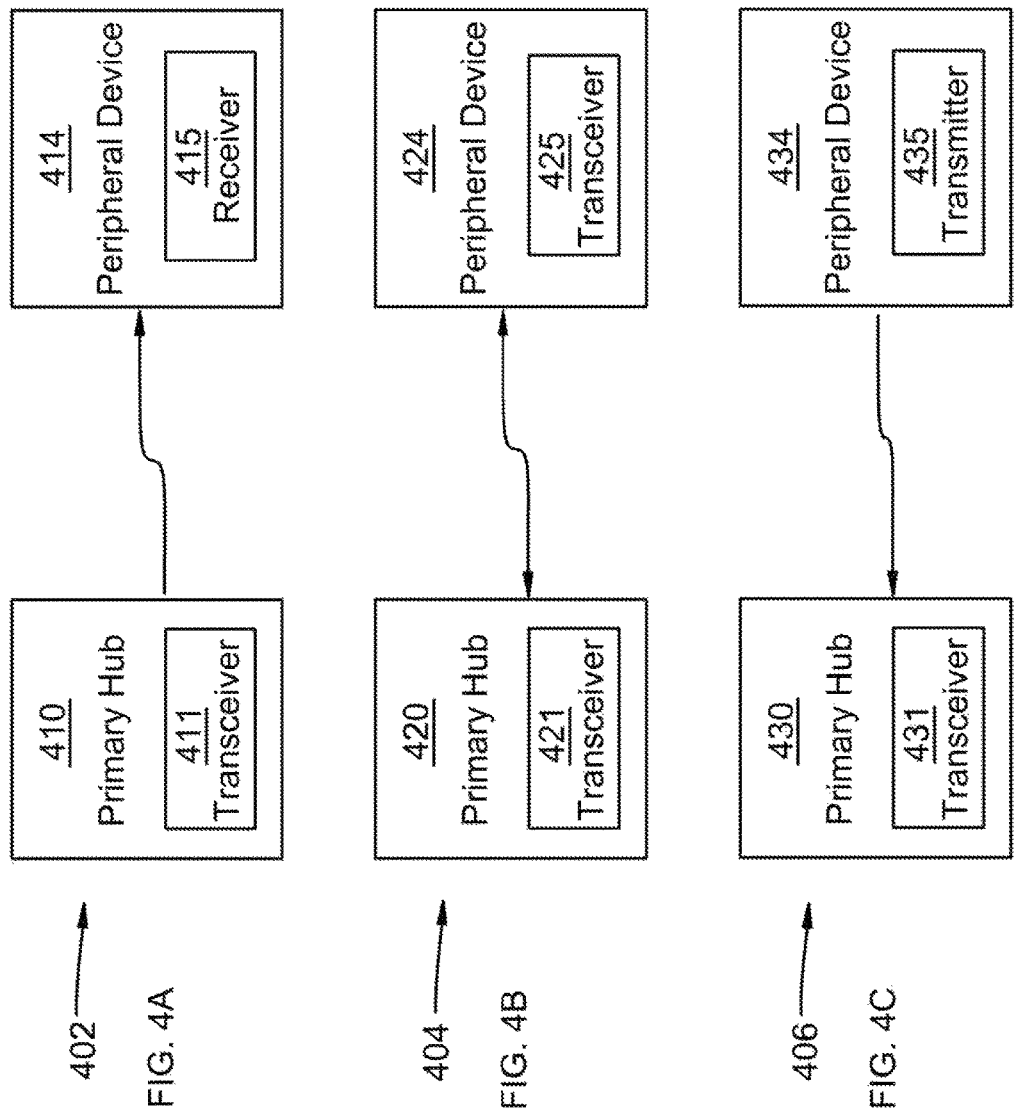
FIGS. 4A-C depict embodiments of a single-hub dual modulation network.

In FIG. 3C, PD 370 includes transceiver 375 and microcontroller 380. Microcontroller 380 is programmed with communication firmware 382, location firmware 384, actuation firmware 388, and includes clock signal 356. Clock signal 386 is synchronized with clock signal 324. Location firmware 384 instructs transceiver 375 to transmit a location signal encoded with a transmit time stamp from clock signal 386. The location signal notifies a receiving device of the time, which is associated with clock signal 386, PD 370 transmitted the location signal. For example, in one embodiment, the receiving device is PNH 310. Because PNH 310 and PD 370 clock signals 324, 386 are synchronized, PNH 310 can determine a time of flight for the signal and determine the distance from PNH 310 to PD 370 and choose an appropriate signal for communication between PNH 310 and PD 370, FIGS. 4A-C depict embodiments of a single-hub dual modulation network 402, 404, 406 similar to the dual-hub modulation networks 302, 304, 306 described above, but without the SNHs. Single-hub dual modulation network 402 is receive-only at the PD, where PNH 410 includes transceiver 411, and PD 414 includes receiver 415. Single-hub dual modulation network 404 is transmit-and-receive at the PD, where PNH 420 includes transceiver 421, and PD 424 includes receiver 425. Single-hub dual modulation network 406 is transmit-only at the PD, where PNH 430 includes transceiver 431, and PD 434 includes receiver 435. Single-hub dual modulation networks 402, 404, 406 are useful where a SNH is not practical. For example, such a network is useful where at least one of the PNH or the PDs are mobile, and where severe obstructions are between the PNH and the PDs.

Figure 5:
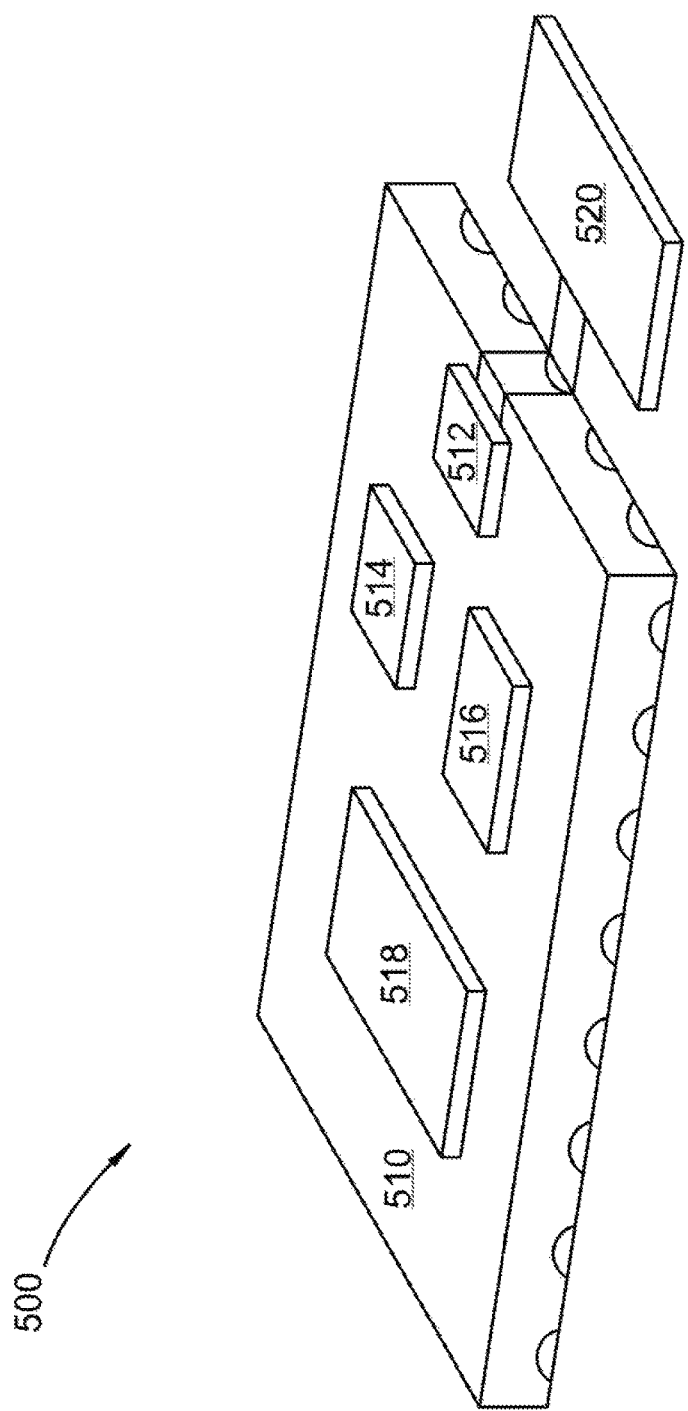
FIG. 5 depicts an example design of a transceiver circuit.

FIG. 5 depicts an example design of a transceiver circuit. Transceiver circuit 500 has, in the example shown, dimensions of approximately ¾-inch by ⅝-inch. However, depending on the desired function, transceiver circuit 500 is, in some embodiments, larger, and in other embodiments, smaller. Components for transceiver circuit 500 are mounted on a PCB 510. The components include transmit/receive switch 512, power amplifier 514, low noise receiver 516, and Long range transceiver 518. Long range transceiver 518 is, in some embodiments, an off-the-shelf transceiver such as a Semtech SX1276 low power RF transceiver. Networked to transmit/receive switch 512 and extending beyond PCB 510 is antenna 520. Antenna 520 is, in some embodiments, any of a variety of off-the-shelf antennas, including a PCB antenna, a chip antenna, and/or a whip antenna. Antenna 520 is, in other embodiments, any of a variety of proprietary and/or application-specific antennas.

Figure 6:
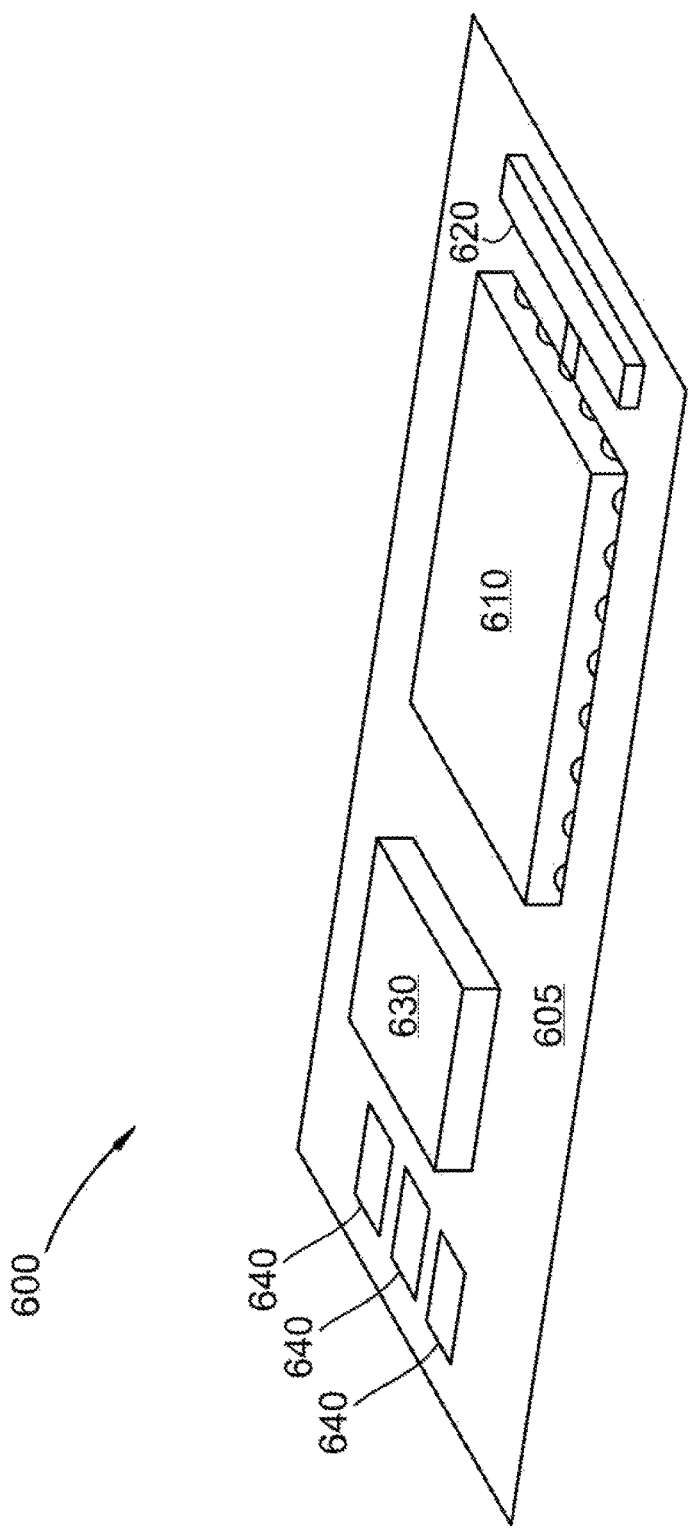
FIG. 6 depicts an example design of a transceiver-microcontroller circuit.

FIG. 6 depicts an example design of a transceiver-microcontroller circuit. Transceiver-microcontroller circuit 600 has, in the example shown, dimensions of approximately 1½-inches by 1-inch. In a similar embodiment, transceiver-microcontroller circuit 600 has dimensions of approximately 2-inches by 1-inch. However, depending on the desired function, transceiver-microcontroller circuit 600 is, in some embodiments, larger, and in other embodiments, smaller. Components for transceiver-microcontroller circuit 600 are mounted to PCB 605. The components include transceiver circuit 610, which is, in some embodiments, similar to transceiver circuit 500 described above, antenna 620, and microcontroller 630. As with antenna 520, antenna 620 is, in some embodiments, any of a variety of off-the-shelf antennas, including a PCB antenna, a chip antenna, and/or a whip antenna. Antenna 620 is, in other embodiments, any of a variety of proprietary and/or application-specific antennas. In some embodiments transceiver-microcontroller circuit 600 includes contacts 640 for powering transceiver-microcontroller circuit 600 and/or for transmitting data to and/or from transceiver-microcontroller circuit 600. For example, in some embodiments, contacts 640 are SD-style contacts.

Figure 7:
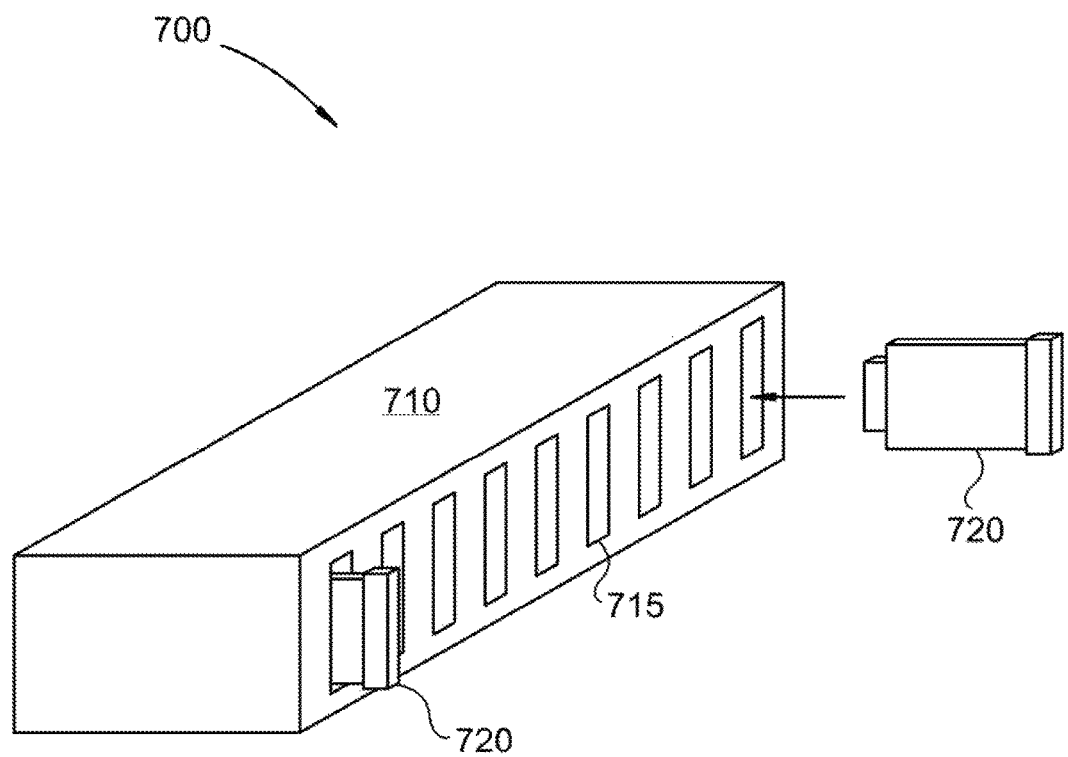
FIG. 7 depicts an example embodiment of a hub.

FIG. 7 depicts an example embodiment of a hub. Hub 700 is, in some embodiments, a PNH. In other embodiments, hub 700 is a SNH. Hub 700 includes housing 710 and transceiver-microcontroller IC ports 715. Transceiver-microcontroller circuit 720 is inserted into transceiver-microcontroller circuit port 715. Hub 700 houses, in the depicted embodiment, between 1 and 9 transceiver-microcontroller ICs 720. In other embodiments, hub 700 houses more than 9 transceiver-microcontroller circuits 720.

Figure 8:
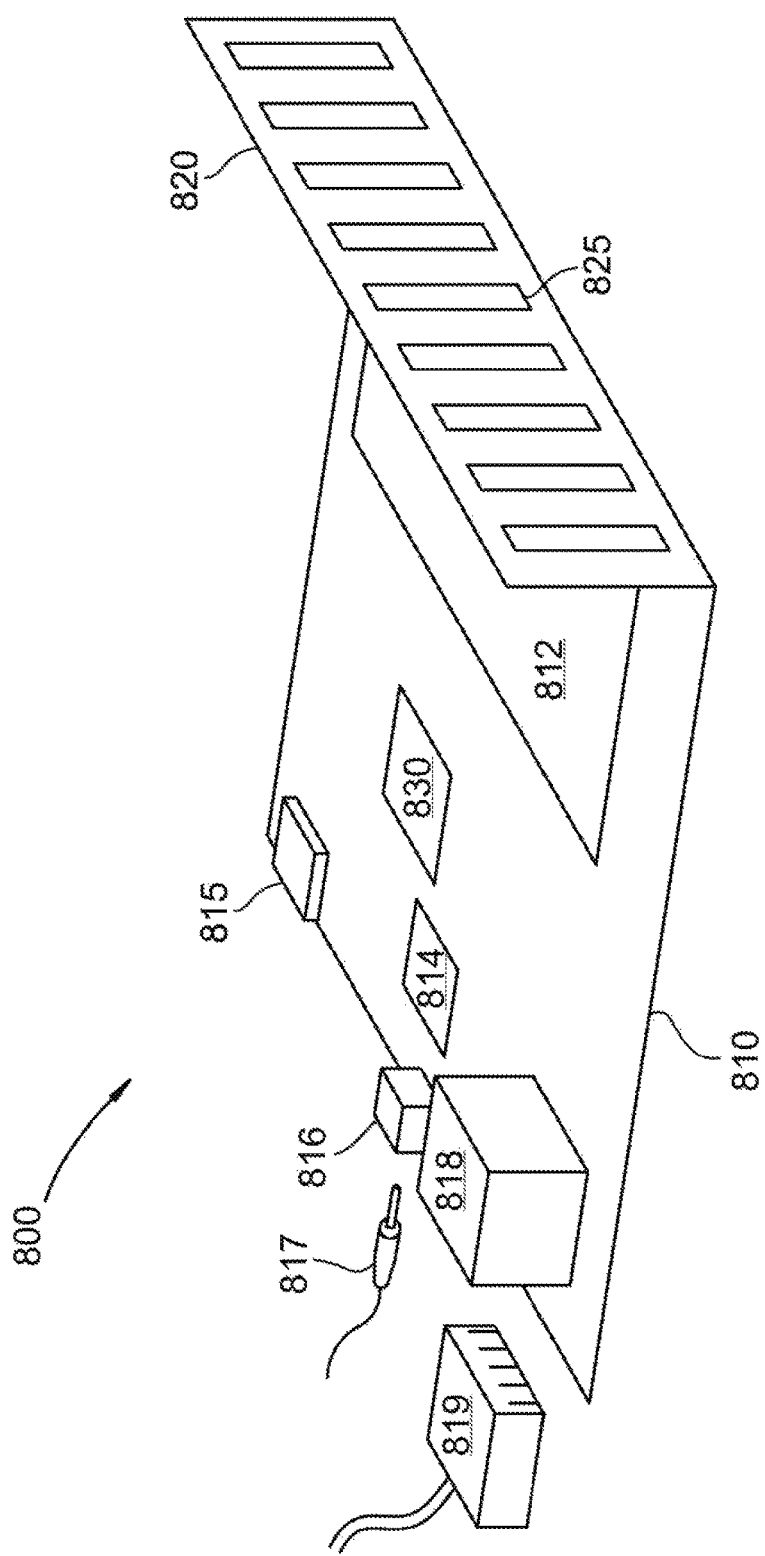
FIG. 8 depicts another example embodiment of a hub.

FIG. 8 depicts another example embodiment of a hub. Hub 800 is, in some embodiments, a PNH. In other embodiments, hub 800 is a SNH. The components of hub 800 are mounted on PCB 810. In some embodiments, hub 800 includes USB port 815, local memory 812, wifi transceiver 814, power transformer 816 for an external power source 817, and Ethernet transceiver 818 for wired Ethernet connection 819. Additionally, hub 800 includes face 820 with transceiver-microcontroller IC ports 825. Transceiver-microcontroller circuits are networked to Hub 800 by, for example, ribbon cable. Hub 800 also includes microcontroller 830 having firmware for hub 800. In some embodiments, the microcontroller 830 firmware includes firmware for controlling Ethernet transceiver 818 and wifi transceiver 814.

Local memory 812 is, in some embodiments, non-volatile flash memory. In some embodiments, local memory 812 includes RAM and additional controllers. In other embodiments, local memory 812 is replaced by other miscellaneous memory and peripherals.

Many of the components described above with regard to hub 800 are optional. For example, some embodiments of hub 800 include only Ethernet transceiver 818 for connecting to an external network. Alternatively, in some embodiments, hub 800 includes only wifi transceiver 814 for connecting to an external network. Wifi transceiver 814 and/or Ethernet transceiver 818 are replaced, in other embodiments, by alternative types of hardware transceivers, such as a Bluetooth transceiver, and other wireless and/or wired transceivers. Similarly, USB port 815 is not included in some embodiments. In other embodiments, USB port 815 is replaced by another external device port, such as an SD-style port, a pin port such as a serial port, a VGA port, an HDMI port, and/or others. In some embodiments, Hub 800 includes ports like those just mentioned in addition to USB port 815.

Figure 9:
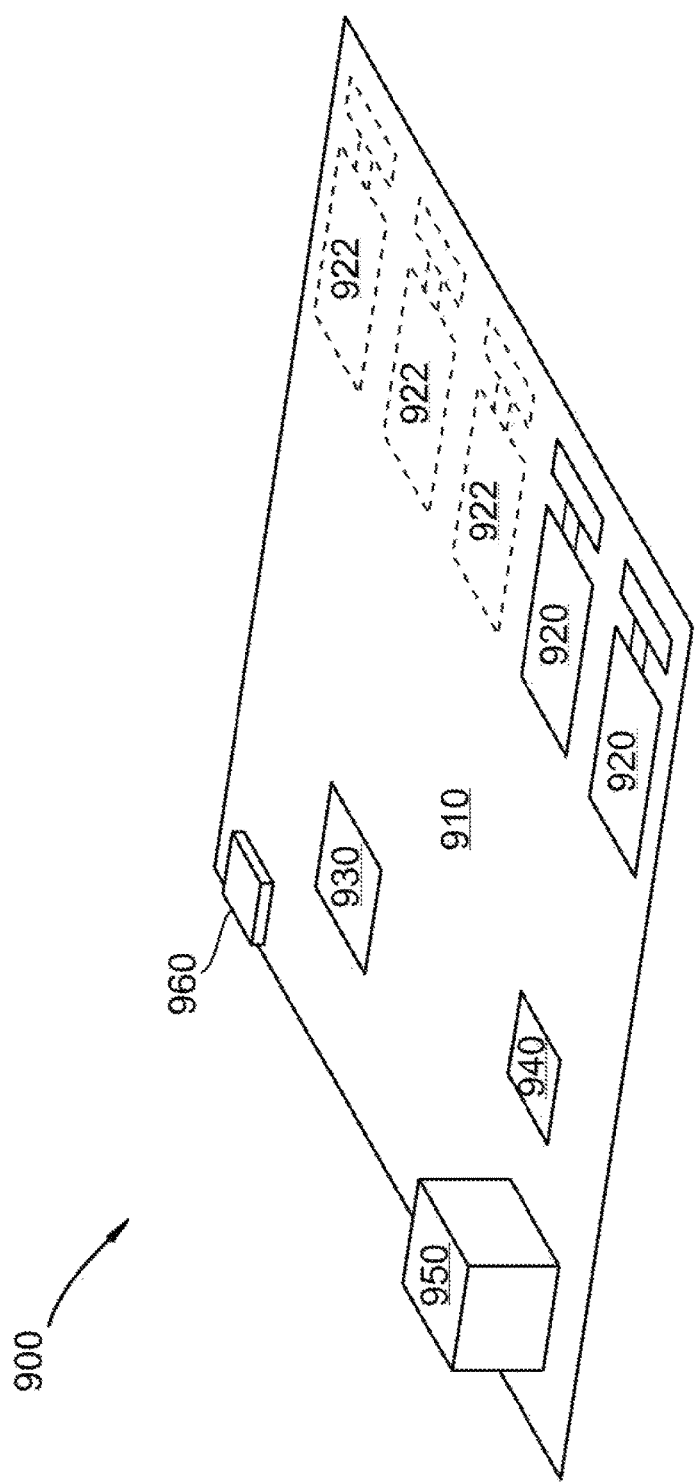
FIG. 9 depicts an alternative embodiment of a hub.

FIG. 9 depicts an alternative embodiment of a hub. Hub 900 is, in some embodiments, a PNH. In other embodiments, hub 900 is a SNH. The components of hub 900, which are, in some embodiments, similar to those of hub 800, are mounted on PCB 910. Different from hub 800, transceiver-microcontroller circuits 920 are mounted directly to PCB 910 on spaces 922 provided for transceiver-microcontroller circuits 920. Hub 900 also includes microcontroller 930, Ethernet controller 940, Ethernet transceiver 950, and USB port 960. Though not depicted, hub 900 also includes, in some embodiments, local volatile and/or non-volatile memory, additional microcontrollers, additional wired or wireless transceivers, and additional I/O ports.

Figure 10:
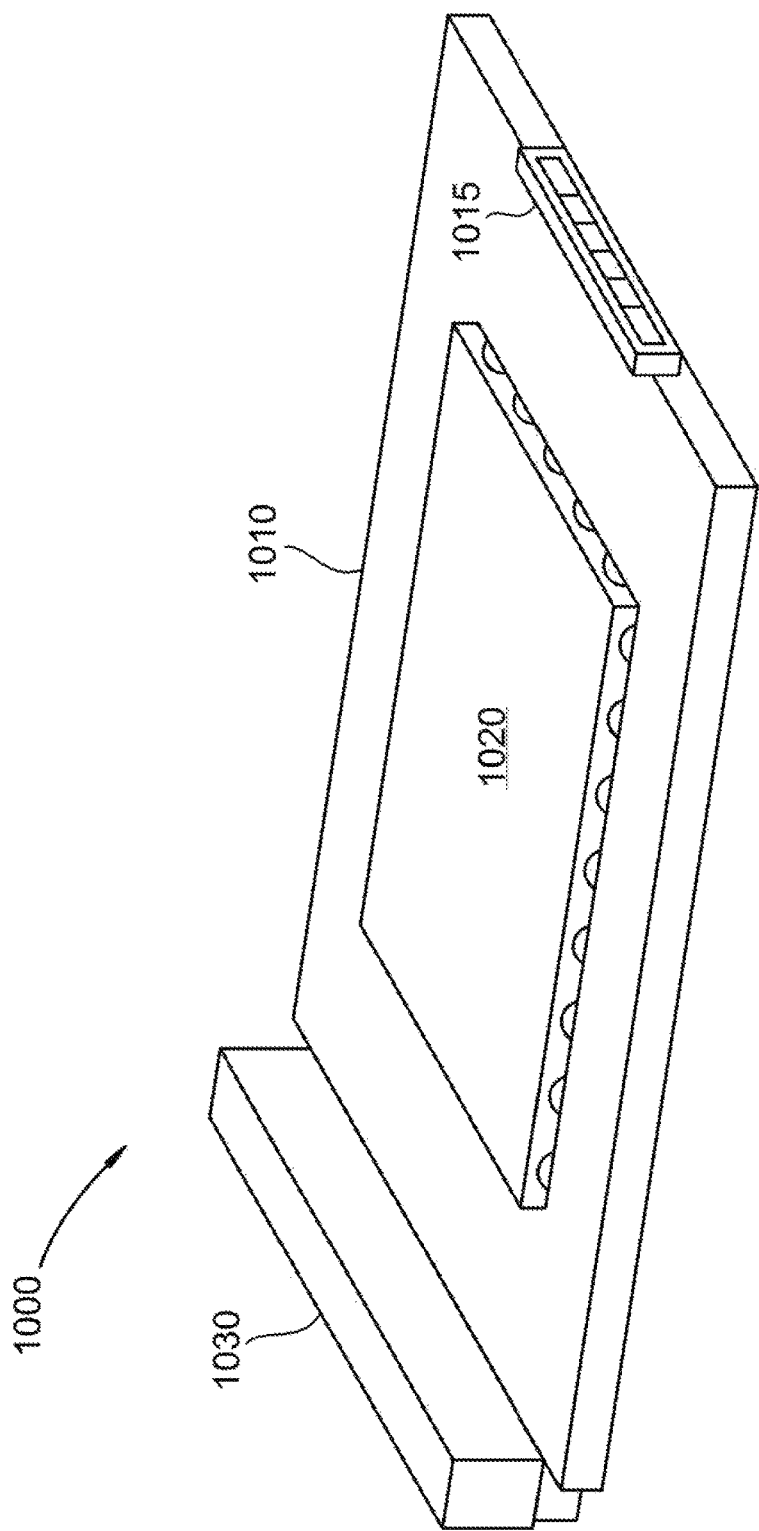
FIG. 10 is another depiction of a transceiver-microcontroller circuit.

FIG. 10 is another depiction of a transceiver-microcontroller circuit. The components of transceiver-microcontroller circuit 1000 are mounted to a PCB 1010 with connector 1015 for connecting to a hub, such as hub 700, hub 800, and/or hub 900. The components include transceiver-microcontroller 1020 and antenna 1030.

Figure 11:
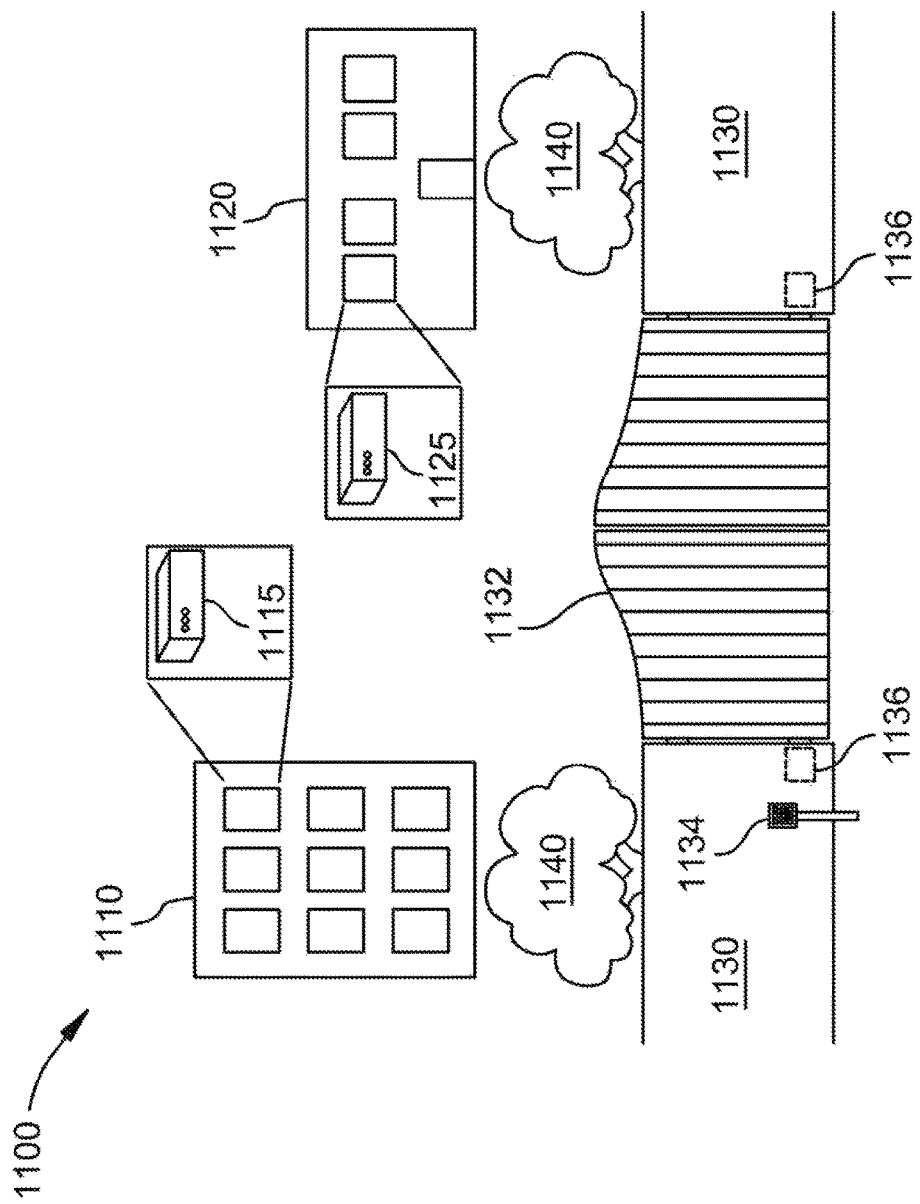
FIG. 11 depicts a specific embodiment of a multi-hub dual modulation network.

FIG. 11 depicts a specific embodiment of a multi-hub dual modulation network such as a network for an access-controlled multi-building industrial complex. Industrial complex 1100 includes building 1110, which houses PNH 1115, and building 1120, which houses SNH 1125. Industrial complex 1100 is surrounded by perimeter fence 1130. Perimeter fence 1130 includes a PD which controls access to industrial complex 1110. In the present embodiment, the PD is an entry gate 1132, and the PD actuation mechanism includes an access pad 1134 and a gate actuator such as gate motors 1136. Access pad 1134 is located remotely from gate motors 1136, and access pad 1134 includes a Long range transceiver and microcontroller as described for PDs above. Between each of PNH 1115, SNH 1125, and access pad 1134 are obstructions 1140. Obstructions 1140 include, in some embodiments, any structure that impedes and/or interferes with RF signal transmission, such as walls and/or buildings. In some embodiments, obstructions 1140 include landscape features, such as trees, bushes, hills, rocks, etc., that impedes and/or interferes with RF signal transmission. Obstructions 1140 also include, in some embodiments, other RF signals that interfere with RF signal transmission.

A multi-hub dual modulation network is useful for centralizing control of many devices located remotely around an industrial complex. In the depicted example, PNH 1115 stores system operation information for all locally networked devices around industrial complex 1100. PNH 1115 communicates local system operation information for PDs in and/or around building 1120 to SNH 1125. SNH 1125 stores the local system operation information and communicates directly with PDs in and/or around building 1120. The system operation information also includes local system operation information for PDs in and/or around building 1110. PNH 1115 communicates directly with PDs in and/or around building 1110. The system operation information also includes system operation information for PDs located remotely from building 1110 and building 1120 around industrial complex 1100, such as access pad 1134. PNH 1115 communicates directly with such PDs in some embodiments, or may assign such PDs to SNH 1125 for operational control.

One example of system operation information is access permission to industrial complex 1100. PNH 1115 receives and stores pin numbers associated with authorized users of gate 1132. In one embodiment, a user inputs a pin into access pad 1134. Access pad 1134 transmits to PNH 1115 via, for example, a long range SS signal, the access pin entered by the user and a gate 1132 identifier. PNH 1115 receives the pin and gate 1132 identifier and compares those to the stored pin numbers associated with authorized users of gate 1132. If the entered pin and gate 1132 identifier match a pin associated with a user of gate 1132, PNH 1115 transmits a signal to motors 1136 to open gate 1132. If the entered pin and gate 1132 identifier do not match a pin associated with a user of gate 1132, no response is sent, or a signal notifying the user access is denied is sent to access pad 1134. In an alternative embodiment, PNH 1115 transmits a signal to access pad 1134 to open gate 1132, which signal is relayed by access pad 1134 to motors 1136.

Another example includes PNH 1115 receiving and storing pin numbers associated with authorized users of gate 1132, and transmitting that data to access pad 1134. Access pad 1134 receives and stores the pin numbers associated with authorized users of gate 1132. A user enters a pin into access pad 1134, and access pad 1134 compares the entered pin to the stored pin numbers associated with authorized users of gate 1132. If the pin matches an authorized pin, access pad 1134 sends a signal to motors 1136 to open gate 1132. Otherwise, no signal is sent, and in some embodiments, access pad 1134 notifies the user that access is denied.

Figure 12:
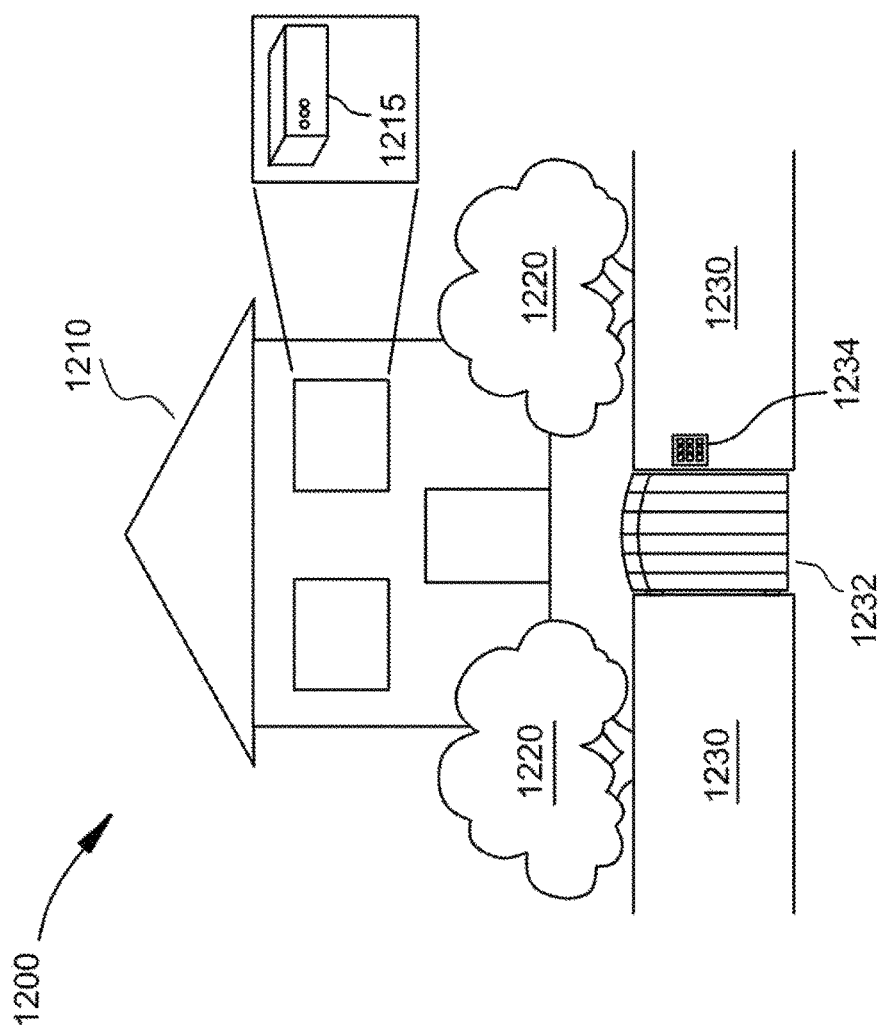
FIG. 12 depicts a specific embodiment of a single-hub dual modulation network.

FIG. 12 depicts a specific embodiment of a single-hub dual modulation network such as a network for a residential home. Residential home 1200 includes house 1210, which houses PNH 1215. Residential home 1100 is surrounded by perimeter fence 1230. Perimeter fence 1230 includes a PD which controls access to residential home 1210. In the present embodiment, the PD is an entry gate 1232, and the PD actuation mechanism includes an access pad 1234. Access pad 1134 includes a Long range transceiver and microcontroller as described for PDs above. Between PNH 1215 and access pad 1234 are obstructions 1220. Obstructions 1220 include, in some embodiments, any structure that impedes and/or interferes with RF signal transmission, such as walls and/or buildings. In some embodiments, obstructions 1220 include landscape features, such as trees, bushes, hills, rocks, etc., that impede and/or interfere with RF signal transmission. Obstructions 1220 also include, in some embodiments, other RF signals that interfere with RF signal transmission.

A single-hub dual modulation network is useful for centralizing control of many devices located remotely around a residential home. In the depicted example, PNH 1215 stores system operation information for all locally networked PDs around residential home 1200, such as access pad 1234. PNH 1215 communicates directly with such PDs.

One example of system operation information is access permission to residential home 1200. PNH 1215 receives and stores pin numbers associated with authorized users of gate 1232. In one embodiment, a user inputs a pin into access pad 1234. Access pad 1234 transmits to PNH 1215 via, for example, a long range SS signal, the access pin entered by the user and a gate 1232 identifier. PNH 1215 receives the pin and gate 1232 identifier and compares those to the stored pin numbers associated with authorized users of gate 1232. If the entered pin and gate 1232 identifier match a pin associated with a user of gate 1232, PNH 1215 transmits a signal to access pad 1234 to unlock gate 1232. If the entered pin and gate 1232 identifier do not match a pin associated with a user of gate 1132, no response is sent, or a signal notifying the user access is denied is sent to access pad 1234.

Another example includes PNH 1215 receiving and storing pin numbers associated with authorized users of gate 1232, and transmitting that data to access pad 1234. Access pad 1234 receives and stores the pin numbers associated with authorized users of gate 1232. A user enters a pin into access pad 1234, and access pad 1234 compares the entered pin to the stored pin numbers associated with authorized users of gate 1232. If the pin matches an authorized pin, access pad 1234 unlocks gate 1132. Otherwise, no signal is sent, and in some embodiments, access pad 1234 notifies the user that access is denied.

Figure 13:
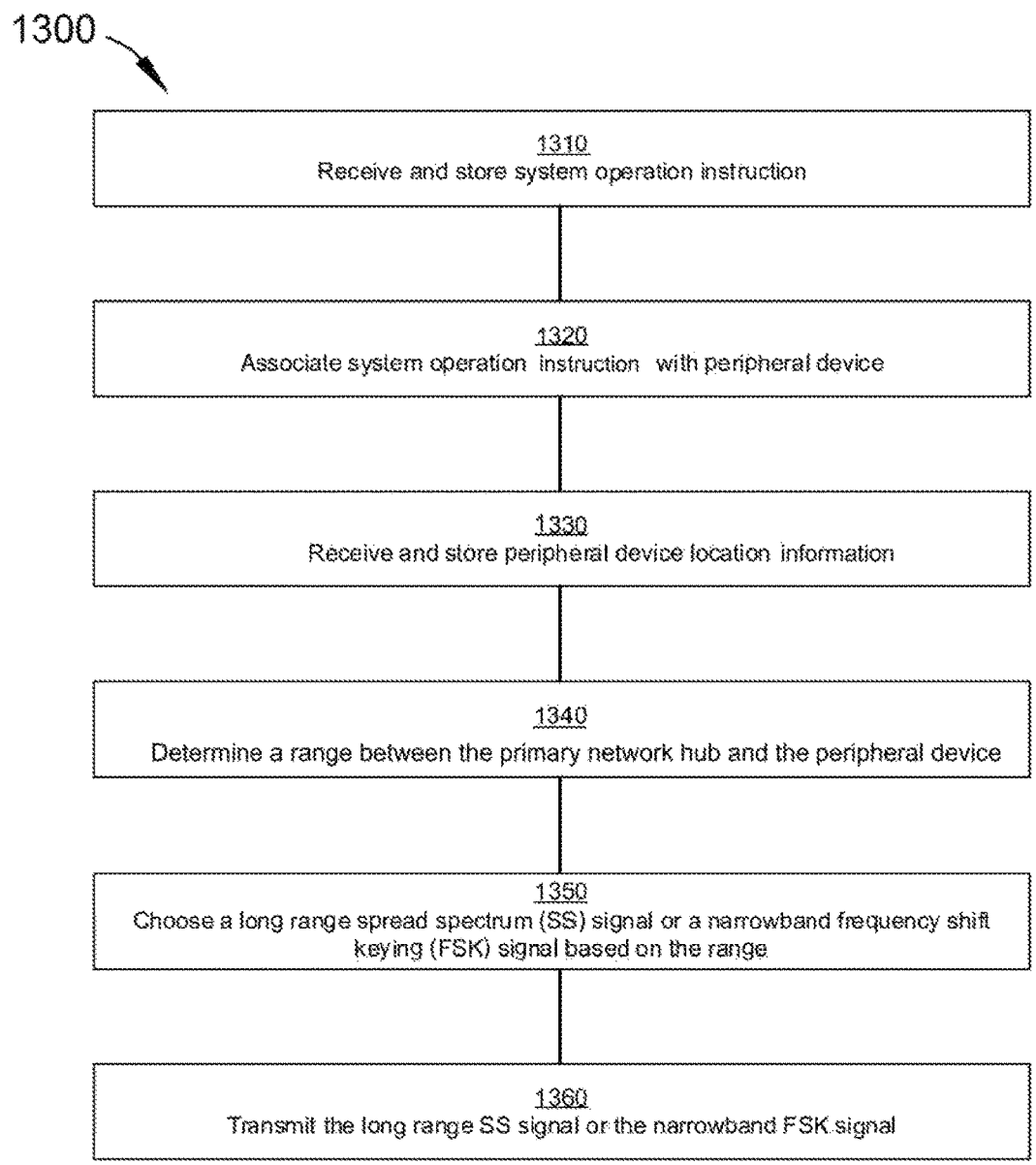
FIG. 13 depicts an example method for communicating over a single-hub dual modulation network.

FIG. 13 depicts an example method 1300 for communicating over a single-hub dual modulation network. At block 1310, a PNH having a Long range transceiver receives and stores a system operation instruction. At block 1320, the PNH associates the system operation instruction with a PD having a Long range transceiver and an actuation mechanism. The PD is located remotely from the PNH. At block 1330, the PNH receives and stores location information associated with the PD. At block 1340, the PNH determines a range between the PNH and the PD. At block 1250, the PNH chooses a long range SS signal or a narrowband FSK signal based on the determined range. For example, the long range SS signal is, in some embodiments, a long range SSFH signal. At block 1260, the PNH transmits the long range SS signal or the narrowband FSK signal communicating actuation instructions for the PD based on the system operation instruction.

A specific embodiment of method 1300 includes one wherein the PD is an access gate for controlling access through a perimeter fence. The actuation instructions include access control instructions for the perimeter fence. For example, the PNH receives and stores pin numbers associated with authorized users of the access gate. The PNH associates the pin numbers with the access gate. The PNH also receives and stores location information for the access gate, and determines a range between the PNH and the access gate. Based on the range, the PNH chooses a long range SS signal or a narrowband FSK signal and transmits the signal communicating the pin numbers to the access gate. The access gate receives the access control instructions. In one embodiment, a user enters a pin into the access pad, and the access pad compares the entered pin to the pin numbers stored at the gate. If the pin matches a stored pin, the access pad unlocks the access gate. Otherwise, the access gate is not unlocked, and in some embodiments, the access pad notifies the user that access is denied.

Figure 14:
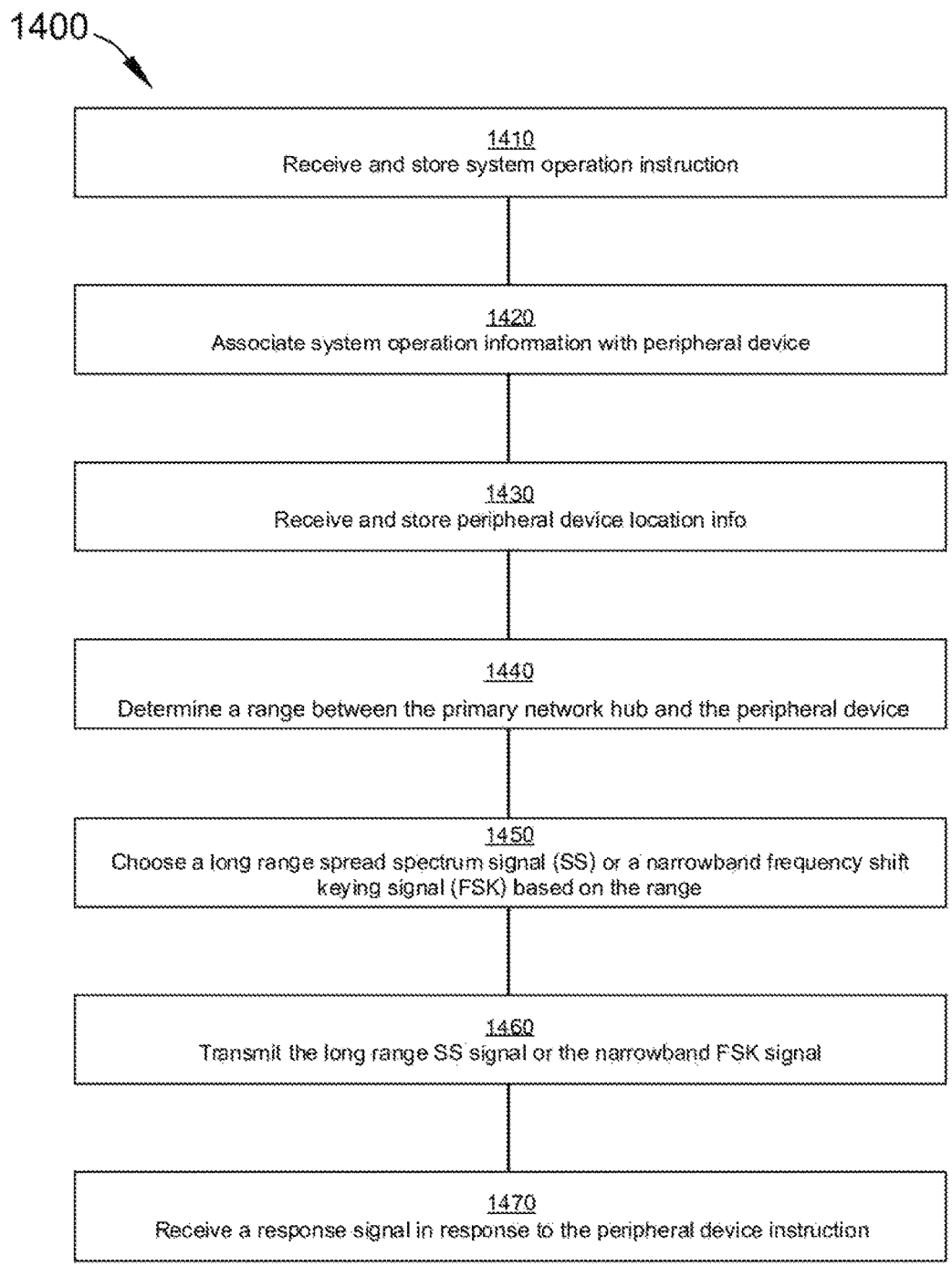
FIG. 14 depicts another example method for single-hub dual modulation network communication.

FIG. 14 depicts another example method 1400 for single-hub dual modulation network communication. At block 1410, a PNH having a Long range transceiver receives and stores a system operation instruction. At block 1420, the PNH associates the system operation instruction with a PD having a Long range transceiver and an actuation mechanism. The PD is located remotely from the PNH. At block 1430, the PNH receives and stores location information associated with the PD. At block 1440, the PNH determines a range between the PNH and the PD. At block 1450, the PNH chooses a long range SS signal or a narrowband FSK signal based on the determined range. For example, the long range SS signal is, in some embodiments, a long range SSFH signal. At block 1460, the PNH transmits the long range SS signal or the narrowband FSK signal communicating actuation instructions for the PD based on the system operation instruction. At block 1470, the PNH receives a response signal from the PD in response to the PD actuation instructions. For example, in one embodiment, an access gate receives instructions to open based on a correctly-entered pin, but the actuation mechanism malfunctions, so the access gate sends a response signal to the PNH communicating that access was authorized but not successfully granted.

Figure 15:
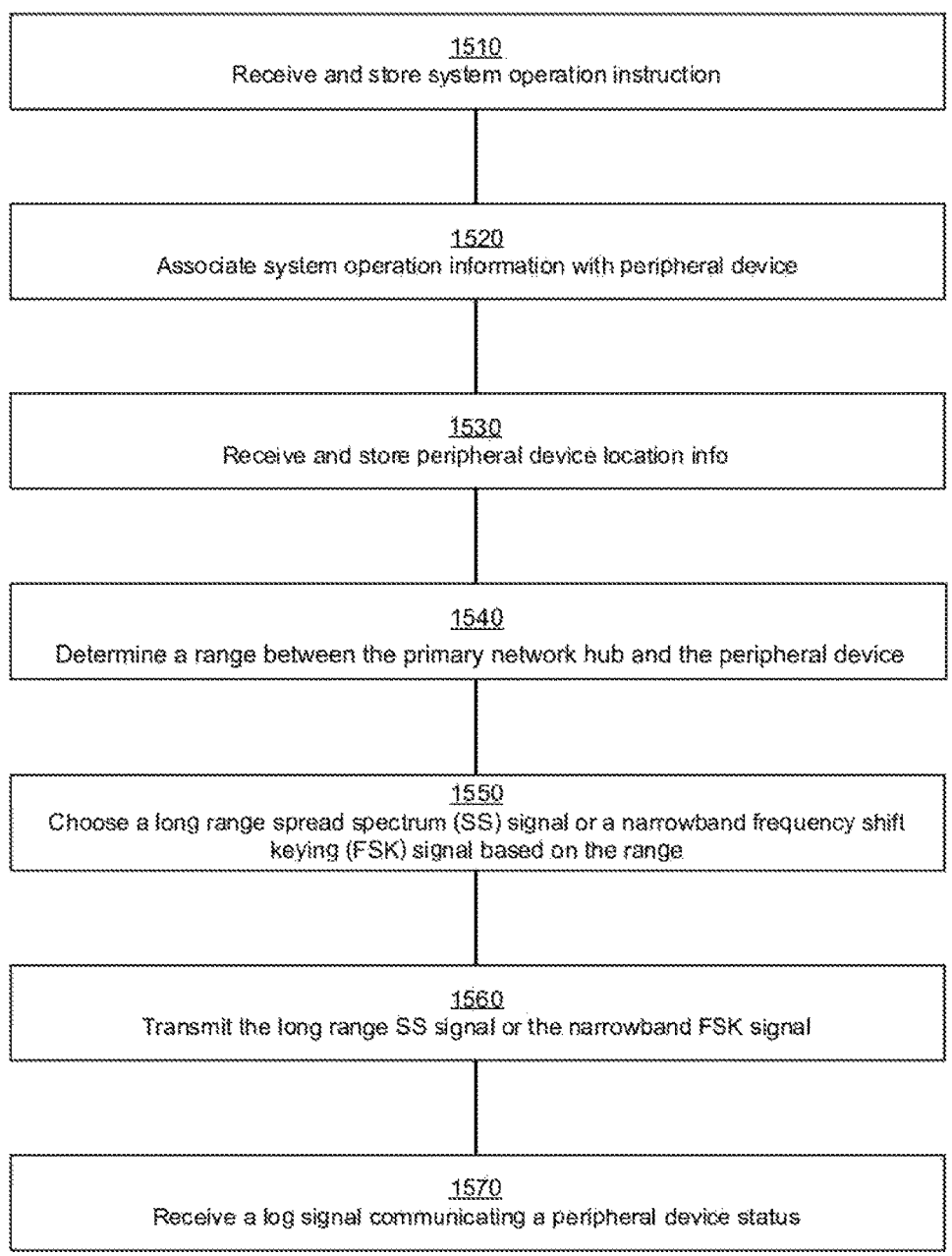
FIG. 15 depicts another example method for single-hub dual modulation network communication.

FIG. 15 depicts another example method 1500 for single-hub dual modulation network communication. At block 1510, a PNH having a Long range transceiver receives and stores a system operation instruction. At block 1520, the PNH associates the system operation instruction with a PD having a Long range transceiver and an actuation mechanism. The PD is located remotely from the PNH. At block 1530, the PNH receives and stores location information associated with the PD. At block 1540, the PNH determines a range between the PNH and the PD. At block 1550, the PNH chooses a long range SS signal or a narrowband FSK signal based on the determined range. For example, the long range SS signal is, in some embodiments, a long range SSFH signal. At block 1560, the PNH transmits the long range SS signal or the narrowband FSK signal communicating actuation instructions for the PD based on the system operation instruction. At block 1570, the PNH receives a log signal communicating a PD status. For example, in one embodiment, a manually-switched light transmits a log signal to the PNH communicating its status change, either from off to on, on to off, or adjustment in brightness, and the PNH receives the log signal and updates the light's status.

Figure 16:
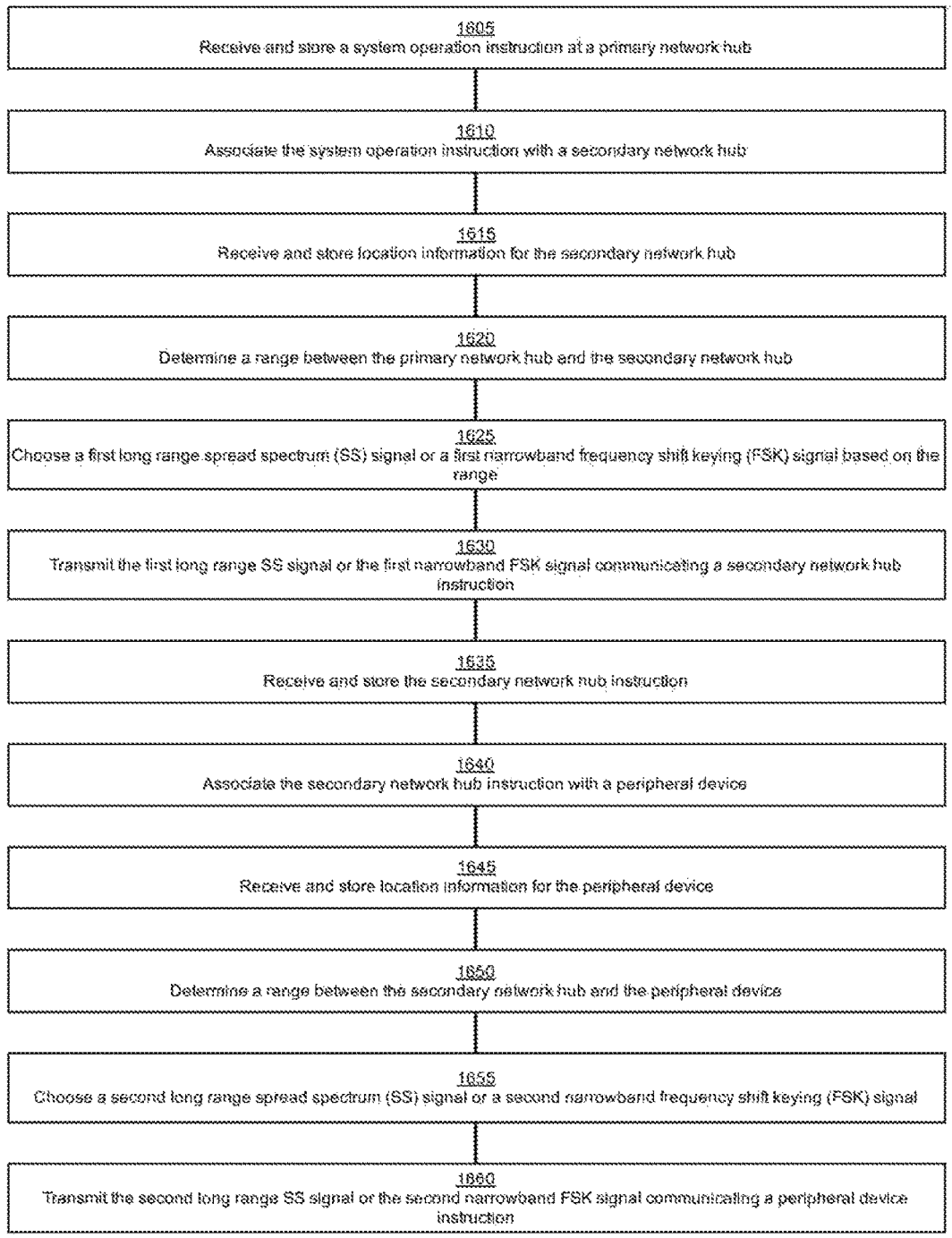
FIG. 16 depicts an example method for communicating over a multi-hub dual modulation network.

FIG. 16 depicts an example method 1600 for communicating over a multi-hub dual modulation network. A multi-hub dual modulation network performs, in some embodiments, any or all of the steps described above with regard to methods 1300, 1400, 1500. Additionally, a multi-hub network acts, in some embodiments, as both a single-hub network and a multi-hub network, where a PNH directly controls PDs, and controls SNHs which in turn control PDs not controlled by the PNH. Or, in some embodiments, the PNH and SNHs share control of PDs.

At block 1605, a PNH having a Long range transceiver receives and stores a system operation instruction. At block 1610, the PNH associates the system operation instruction with a SNH having a Long range transceiver and located remotely from the PNH. At block 1615, the PNH receives and stores location information associated with the SNH. At block 1620, the PNH determines a range between the PNH and the SNH. At block 1625, the PNH chooses a first long range SS signal or a first narrowband FSK signal based on the range between the PNH and the SNH. For example, the long range SS signal is, in some embodiments, a long range SSFH signal. At block 1630, the PNH transmits the first long range SS signal or the first narrowband FSK signal from the PNH communicating a SNH instruction based on the system operation instruction. At block 1635, the SNH receives and stores the SNH instruction. At block 1640, the SNH associates the SNH instruction with a PD having a Long range transceiver and an actuation mechanism. The PD is located remotely from the SNH and the PNH. At block 1645, the SNH receives and stores location information associated with the PD. At block 1650, the SNH determines a range between the SNH and the PD. At block 1655, the SNH chooses a second long range SS signal or a second narrowband FSK signal based on the range between the SNH and the PD. For example, the long range SS signal is, in some embodiments, a long range SSFH signal. At block 1660, the SNH transmits the second long range SS signal or the second narrowband FSK signal communicating a PD instruction based on the SNH instruction.

A specific embodiment of method 1600 includes one wherein the PD is an access gate for controlling access through a perimeter fence. The PD instructions include access control instructions for the perimeter fence. For example, a PNH receives and stores pin numbers associated with authorized users of the access gate. The PNH associates the pin numbers with a SNH that controls access gate. The PNH also receives and stores location information for the SNH, and determines a range between the PNH and the SNH. Based on the range, the PNH chooses a long range SS signal or a narrowband FSK signal and transmits the signal communicating the pin numbers to the SNH. The SNH receives and stores the pin numbers associated with authorized users of the access gate. The SNH associates the pin numbers with the access gate. The SNH also receives and stores location information for the access gate, and determines a range between the SNH and the access gate. Based on the range, the SNH chooses a long range SS signal or a narrowband FSK signal and transmits the signal communicating the pin numbers to the access gate. The access gate receives the access control instructions. In one embodiment, a user enters a pin into the access pad, and the access pad compares the entered pin to the pin numbers stored at the gate. If the pin matches a stored pin, the access pad unlocks the access gate. Otherwise, the access gate is not unlocked, and in some embodiments, the access pad notifies the user that access is denied.

A multi-hub dual modulation network can be particularly beneficial in embodiments where there are too many PDs for a PNH to control directly, and/or in embodiments where many PDs are outside a PNH-PD transmit-receive range, but within a SNH-PD transmit-receive range.

The invention claimed is:

1. A system comprising:
a primary network hub (PNH) comprising:
  a PNH Long range transceiver; and
  a PNH microcontroller comprising:
    PNH long range transceiver firmware, wherein the PNH long range transceiver firmware comprises long range spread spectrum (SS) and narrowband frequency shift keying (FSK) signal communication instructions;
    a PNH clock signal; and
a peripheral device (PD) comprising:
  an actuation mechanism;
  a PD Long range transceiver; and
  a PD microcontroller comprising:
    actuation firmware;
    PD long range transceiver communication firmware;
    a PD clock signal synchronized with the PNH clock signal; and
    location firmware, wherein the location firmware instructs the PD long range transceiver to transmit a location signal encoded with a PD transmit time stamp notifying a receiving device of the time the PD transmitted the location signal,
wherein the PD is an entry gate to a perimeter fence, and wherein the actuation mechanism comprises an access pad and a gate actuator.

2. The system of claim 1, wherein the PD communication firmware comprises instructions for long range SS signal communication, narrowband FSK signal communication, or both.

3. The system of claim 1, further comprising a secondary network hub (SNH) located remotely from the PNH within a PNH-SNH transmit-receive range, comprising:
  a SNH long range transceiver; and
  a SNH microcontroller comprising communication firmware for long range SS and FSK signal communication via the secondary network hub long range transceiver, wherein the PNH stores network-wide system operation instructions and the SNH stores local system operation instructions.

4. The system of claim 3, wherein the SNH microcontroller further comprises a SNH clock signal.

5. The system of claim 4, wherein the SNH clock signal is synchronized with the PNH clock signal, and wherein the SNH microcontroller further comprises location firmware, wherein the location firmware instructs the SNH long range transceiver to transmit a location signal encoded with a SNH transmit time stamp notifying a receiving device of the time the SNH transmitted the location signal.

6. The system of claim 4, wherein the PD clock signal is also synchronized with the SNH clock signal.

7. The system of claim 1, wherein the access pad it located remotely from the gate actuator, and wherein the access pad comprises the PD long range transceiver and the PD microcontroller, wherein the actuation firmware comprises instructions for transmitting a gate latch actuation signal.

8. The system of claim 1, wherein the gate latch comprises a receiver, a transceiver, or both that receives the gate latch actuation signal, wherein the gate latch actuates in accordance with the gate latch actuation signal.

9. A method comprising:
receiving and storing a system operation instruction at a primary network hub (PNH) having a Long range transceiver;
associating the system operation instruction with a peripheral device (PD) having a long range transceiver and an actuation mechanism, and located remotely from the PNH, wherein the PD is an access gate for controlling access through a perimeter fence;
receiving and storing, at the PNH, PD location information associated with the PD;
determining a range between the PNH and the PD;
choosing a long range spread spectrum (SS) signal or a narrowband frequency shift keying (FSK) signal based on the range; and
transmitting the long range SS signal or the narrowband FSK signal from the PNH communicating actuation instructions for the PD based on the system operation instruction.

10. The method of claim 9, wherein the long range SS signal is a long range spread spectrum frequency hopping signal.

11. The method of claim 9, further comprising receiving a response signal in response to the actuation instructions.

12. The method of claim 9, further comprising receiving a log signal communicating a PD status.

13. The method of claim 9, wherein the actuation instructions comprise access control instructions for the perimeter fence.

14. The method of claim 9, further comprising receiving, at the access gate, a request for access through the perimeter fence and granting or denying access based on the access control instructions.

15. A method comprising:

receiving and storing a system operation instruction at a PNH having a long range transceiver;

associating the system operation instruction with a SNH having a long range transceiver and located remotely from the PNH;

receiving and storing, at the primary network hub, location information for the SNH;

determining a range between the PNH and the SNH;

choosing a first long range spread spectrum (SS) signal or a first narrowband frequency shift keying (FSK) signal based on the range between the PNH and the SNH;

transmitting the first long range SS signal or the first narrowband FSK signal from the PNH communicating a SNH instruction based on the system operation instruction;

receiving, at the SNH long range transceiver, the SNH instruction;

associating the SNH instruction with a peripheral device (PD) having a long range transceiver and an actuation mechanism, and located remotely from the SNH and the PNH, wherein the PD is an access gate for controlling access through a perimeter fence;

receiving and storing, at the SNH, location information for the PD;

determining a range between the SNH and the PD;

choosing a second long range spread spectrum (SS) signal or a second narrowband frequency shift keying (FSK) signal based on the range between the SNH and the PD; and transmitting the second long range SS signal or the second narrowband FSK signal from the SNH communicating a PD instruction based on the SNH instruction.

16. The method of claim 15, wherein the PD instruction comprises access control instructions for the perimeter fence.

17. The method of claim 15, further comprising receiving, at the access gate, a request for access through the perimeter fence and granting or denying access based on the access control instructions.

* * * * *